(12) United States Patent
Lu et al.

(10) Patent No.: US 8,943,426 B2
(45) Date of Patent: Jan. 27, 2015

(54) METHOD FOR DISPLAYING BACKGROUND WALLPAPER AND ONE OR MORE USER INTERFACE ELEMENTS ON DISPLAY UNIT OF ELECTRICAL APPARATUS AT THE SAME TIME, COMPUTER PROGRAM PRODUCT FOR THE METHOD AND ELECTRICAL APPARATUS IMPLEMENTING THE METHOD

(75) Inventors: Tai-Ling Lu, Taoyuan (TW);
Ying-Chung Chen, Taoyuan (TW);
Chi-Pang Chiang, Taoyuan (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 146 days.

(21) Appl. No.: 13/288,118

(22) Filed: Nov. 3, 2011

(65) Prior Publication Data

US 2013/0117697 A1    May 9, 2013

(51) Int. Cl.
*G06F 3/048* (2013.01)
*G06F 3/0482* (2013.01)
*G06F 3/0481* (2013.01)

(52) U.S. Cl.
CPC .......... *G06F 3/0482* (2013.01); *G06F 3/04817* (2013.01)
USPC .......................................... 715/765; 382/190

(58) Field of Classification Search
CPC ............... G06F 3/00; G06K 9/40; G06K 9/46
USPC ........................... 715/765, 766; 382/190, 254
See application file for complete search history.

(56) References Cited

U.S. PATENT DOCUMENTS

| 6,760,048 B1* | 7/2004 | Bates et al. .................... 715/797 |
| 2003/0016869 A1* | 1/2003 | Laumeyer et al. ............ 382/190 |

(Continued)

FOREIGN PATENT DOCUMENTS

| EP | 1684262 A1 | 7/2006 |
| JP | 04-150177 | 5/1992 |

(Continued)

OTHER PUBLICATIONS

English translation of abstract of JP 2010-258914 (published Nov. 11, 2010).

(Continued)

*Primary Examiner* — Anil Bhargava
(74) *Attorney, Agent, or Firm* — McClure, Qualey & Rodack, LLP

(57) ABSTRACT

A method for displaying background wallpaper and one or more user interface elements on a display unit of an electrical apparatus at the same time is disclosed. In the method, a Region of Interest (ROI) on the background wallpaper is designated by analyzing the background wallpaper. The background wallpaper is displayed. The one or more user interface elements on an area of the displayed background wallpaper without covering the ROI are displayed. An electrical apparatus implementing the method and a computer program product for the method are also disclosed.

18 Claims, 5 Drawing Sheets

(56) References Cited

U.S. PATENT DOCUMENTS

| | | | |
|---|---|---|---|
| 2003/0179234 A1* | 9/2003 | Nelson et al. | 345/764 |
| 2004/0076335 A1* | 4/2004 | Kim | 382/257 |
| 2004/0190787 A1* | 9/2004 | Nakami | 382/260 |
| 2007/0266319 A1* | 11/2007 | Matsuo | 715/700 |
| 2008/0050030 A1* | 2/2008 | Hara | 382/254 |
| 2008/0094421 A1* | 4/2008 | Maeda | 345/661 |
| 2009/0003698 A1* | 1/2009 | Milward et al. | 382/171 |
| 2009/0210820 A1* | 8/2009 | Adachi et al. | 715/786 |
| 2009/0274364 A1* | 11/2009 | Shakya et al. | 382/165 |
| 2010/0260406 A1* | 10/2010 | Sammak et al. | 382/133 |
| 2011/0148917 A1* | 6/2011 | Alberth et al. | 345/629 |
| 2012/0154420 A1* | 6/2012 | Calandrino et al. | 345/589 |
| 2013/0336581 A1* | 12/2013 | Datta et al. | 382/165 |

FOREIGN PATENT DOCUMENTS

| | | |
|---|---|---|
| JP | 10-200873 | 7/1998 |
| JP | 2007-199311 | 8/2007 |
| JP | 2009-296397 | 12/2009 |
| JP | 2010-258914 A | 11/2010 |
| JP | 2013-92988 | 5/2013 |
| TW | 201032120 | 9/2010 |
| WO | 2006/123513 | 11/2006 |
| WO | 2011/061905 | 5/2011 |

OTHER PUBLICATIONS

English translation of abstract of JP 2013-92988 (published May 16, 2013).

English translation of abstract of JP 2009-296397 (published Dec. 17, 2009).

English translation of abstract of JP 2007-199311 (published Aug. 9, 2007).

English translation of abstract of JP 10-200873 (published Jul. 31, 1998).

English translation of abstract of JP 04-150177 (published May 22, 1992).

Japan Office Action dated Sep. 10, 2013.

European Search Report dated Sep. 25, 2013.

English translation of abstract of TW 201032120 (published Sep. 1, 2010).

EP Office Action dated May 14, 2014.

Summons to attend oral proceedings for EP 12007315.0 (dated Nov. 18, 2014).

\* cited by examiner

METHOD FOR DISPLAYING BACKGROUND WALLPAPER AND ONE OR MORE USER INTERFACE ELEMENTS ON DISPLAY UNIT OF ELECTRICAL APPARATUS AT THE SAME TIME, COMPUTER PROGRAM PRODUCT FOR THE METHOD AND ELECTRICAL APPARATUS IMPLEMENTING THE METHOD

BACKGROUND

1. Technical Field

The present invention relates to a display method associated with computer wallpaper. More particularly, the present invention relates to a method for displaying a background wallpaper and one or more user interface elements on a display unit of an electrical apparatus at the same time, a computer program product for the method and an electrical apparatus implementing the method.

2. Description of Related Art

Most modern handheld electrical apparatuses can provide a function to show a personalized wallpaper, such as a static wallpaper, a live wallpaper and an idle screen background. In other words, users can choose their favorite images for use as background wallpapers to be shown on desktops of their handheld electrical apparatuses. Icons, widgets, or other user interface elements displayed on desktops may cover a user's favorite objects displayed thereon. Hence, the user has to rearrange the positions of the user interface elements so that their favorite objects are not covered.

As a result, there is a need to prevent the covering of a user's favorite objects by other user interface elements.

SUMMARY

According to one embodiment of this invention, a method for displaying a background wallpaper and one or more user interface elements on a display unit of an electrical apparatus at the same time is provided. In the method, an ROI on the background wallpaper is designated by analyzing the background wallpaper. The background wallpaper is displayed. The one or more user interface elements are displayed on an area of the displayed background wallpaper without covering the ROI.

According to another embodiment of this invention, an electrical apparatus is provided. The electrical apparatus includes a display unit, a display control unit, and a processing unit. The display control unit is electrically connected to the display unit, and the processing unit is electrically connected to the display control unit. The display control unit is configured to control the display unit. The processing unit designates an ROI on a background wallpaper by analyzing the background wallpaper. The display control unit controls the display unit to display the background wallpaper and one or more user interface elements on an area of the displayed background wallpaper without covering the ROI.

The present invention can achieve many advantages. An area on the display unit for displaying an ROI is not covered by any user interface element. In other words, an area which interests users is not blocked visually by any user interface element.

These and other features, aspects, and advantages of the present invention will become better understood with reference to the following description and appended claims. It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
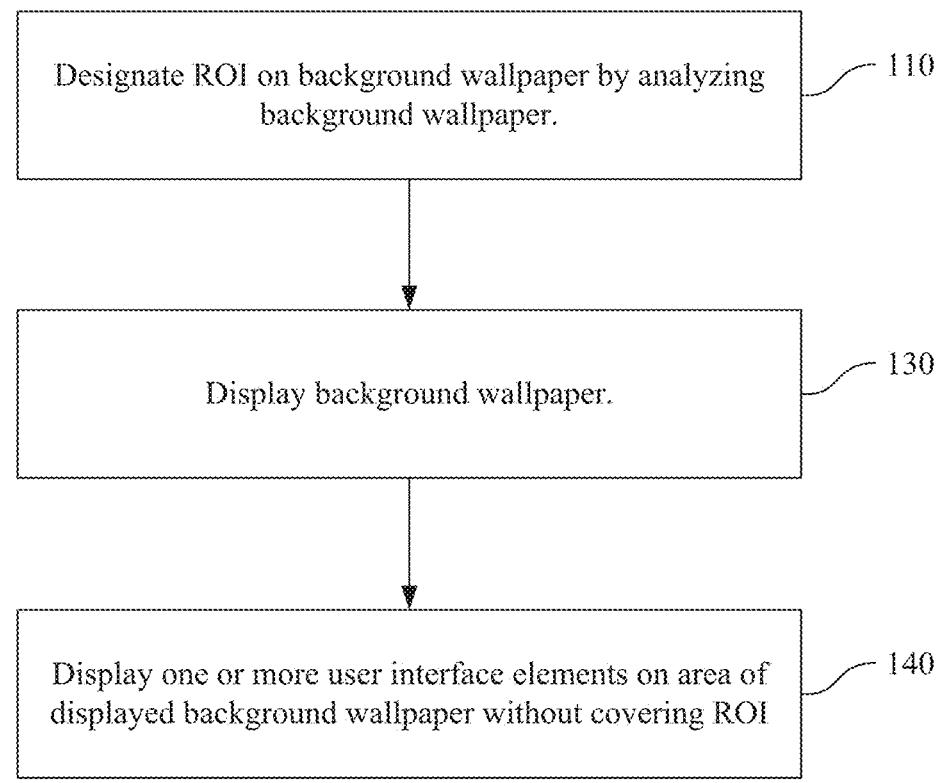
FIG. 1 illustrates a flow diagram of a method for displaying a background wallpaper and one or more user interface elements on a display unit of an electrical apparatus at the same time according to one embodiment of this invention.

Reference will now be made in detail to the present embodiments of the invention, examples of which are illustrated in the accompanying drawings. Wherever possible, the same reference numbers are used in the drawings and the description to refer to the same or like parts.

Figure 2:
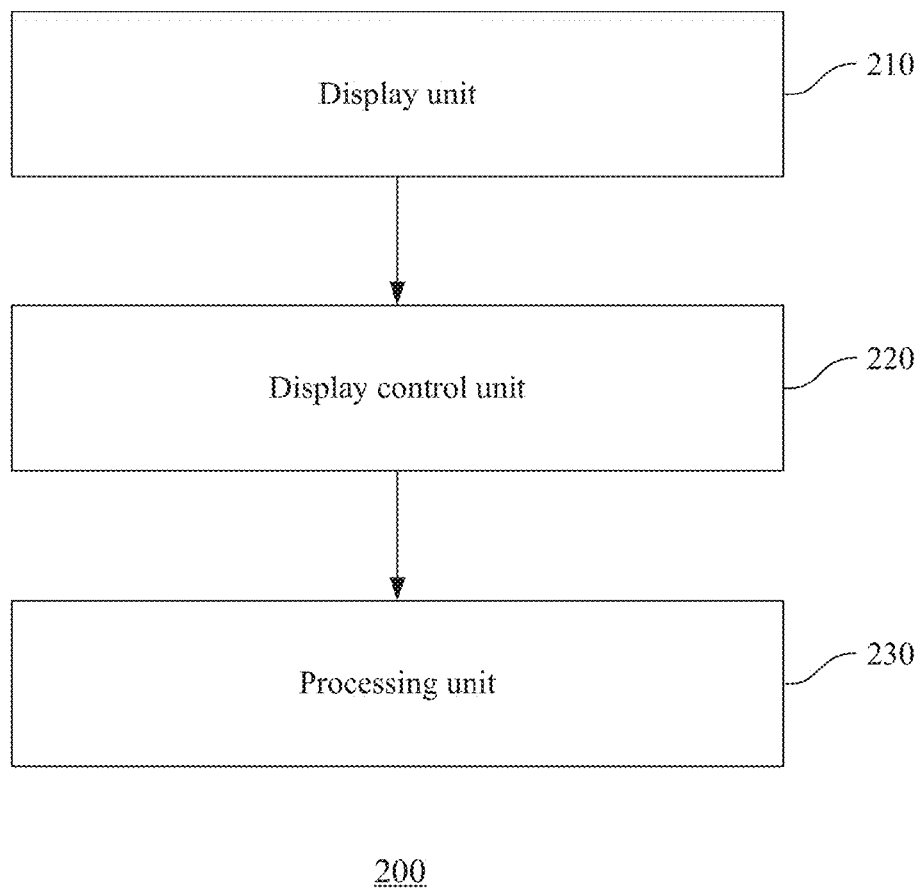
FIG. 2 illustrates an embodiment of a block diagram of an electrical apparatus implementing a method for displaying a background wallpaper and one or more user interface elements on a display unit of an electrical apparatus at the same time.

FIG. 1 illustrates a flow diagram of a method for displaying a background wallpaper and one or more user interface elements on a display unit of an electrical apparatus at the same time according to one embodiment of this invention. The background wallpaper may be a static wallpaper, a live wallpaper, an idle screen or a combination thereof. The one or more user interface elements may be at least one icon, at least one widget, at least one notification, at least one button, or any combination thereof. FIG. 2 illustrates an embodiment of a block diagram of an electrical apparatus implementing the method. In the method, an electrical apparatus is provided to designate an ROI on a background wallpaper displayed on a display unit thereof, and to display the background wallpaper and one or more user interface elements without covering the ROI on its display unit.

The method can be implemented as a computer program product. The computer program product stores a computer program for an electrical apparatus. When an electrical apparatus with a display unit loads the computer program stored in the computer program product, the electrical apparatus can execute the method. The computer program product may be stored in any suitable storage medium including non-volatile memory such as read only memory (ROM), programmable read only memory (PROM), erasable programmable read only memory (EPROM), and electrically erasable programmable read only memory (EEPROM) devices; volatile memory such as static random access memory (SRAM), dynamic random access memory (DRAM), and double data rate random access memory (DDR-RAM); optical storage devices such as compact disc read only memories (CD-ROMs) and digital versatile disc read only memories (DVD-ROMs); and magnetic storage devices such as hard disk drives (HDD) and floppy disk drives.

Reference is now made to FIG. 1 and FIG. 2. The electrical apparatus 200 includes a display unit 210, a display control unit 220, and a processing unit 230. The display control unit 220 is electrically connected to the display unit 210, and the processing unit 230 is electrically connected to the display control unit 220. The display control unit 220 is configured to control the display unit 210. The display control unit 220 may be a Graphics Processing Unit (GPU) or any other type of display control unit. The processing unit 230 may be a Central Processing Unit (CPU) or any other type of processing unit.

The routine 100 of the method begins at operation 110, where the processing unit 230 designates an ROI on the background wallpaper by analyzing the background wallpaper. The ROI includes a subject of interest, that is, an area which interests users, on the background wallpaper. For example, users may set a human face as a subject of interest. Hence, the processing unit 230 may analyze the background wallpaper to designate an ROI, which includes a human face, on the background wallpaper. In another embodiment of this invention, if the background wallpaper is a live wallpaper, which includes several continuous images, the processing unit 230 may analyze the continuous images to designate the ROI on the background wallpaper. For example, the processing unit 230 may designate an area of the continuous images on which a subject of interest is displayed, and the designated area is taken as the ROI. In other embodiments, other subjects of interest may be set for the processing unit 230 to designate at operation 110.

The routine 100 continues to operation 130, where the display control unit 220 controls the display unit 210 to display the background wallpaper.

At operation 140, the display control unit 220 controls the display unit 210 to display the one or more user interface elements on an area of the displayed background wallpaper without covering the ROI. Therefore, the ROI with a subject of interest is not be covered by any user interface element. In other words, a subject which interests users can be displayed on the display unit 210 without being visually blocked.

In one embodiment of operation 140, the display control unit 220 may move at least one of the one or more user interface elements displayed on the display unit 210 so that the one or more user interface elements is displayed on the displayed background wallpaper without covering the ROI. Therefore, by moving the user interface elements, a subject which interests users is prevented from being visually blocked.

In another embodiment of operation 140, the display control unit 220 may adjust the size of at least one of the one or more user interface elements displayed on the display unit 210 so that the one or more user interface elements are displayed in an area of the background wallpaper outside of the ROI. Therefore, even if the area outside the ROI on the background wallpaper is small or the size of the user interface elements is large, the subject which interests users is prevented from being visually blocked after such size adjustment.

Figure 3A:
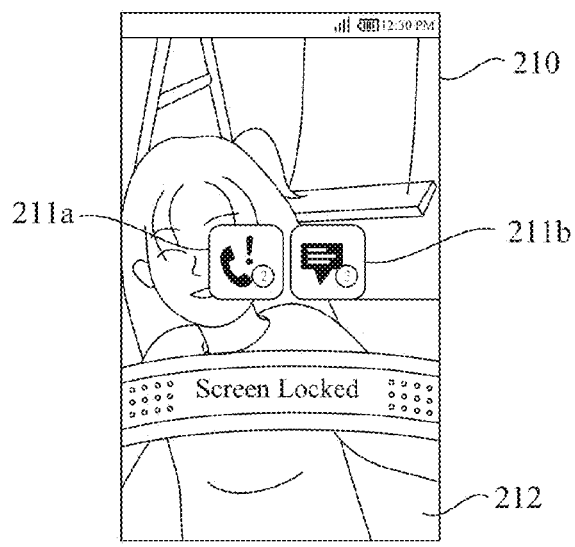
FIG. 3A to FIG. 3C illustrate an embodiment of the manner in which user interface elements are moved.
Figure 3B:
Figure 3C:
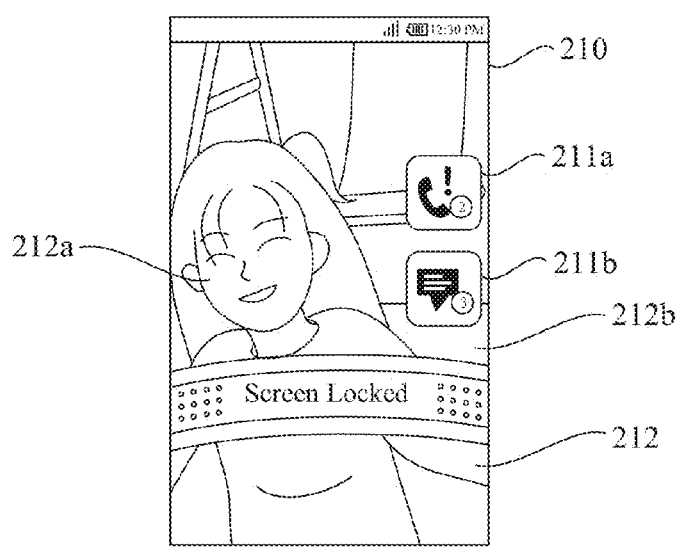

FIG. 3A to FIG. 3C illustrate an embodiment of the manner in which user interface elements are moved. In FIG. 3A, the display unit 210 displays several user interface elements 211a, 211b. In FIG. 3B, if the subject of interest is set to a human face, the processing unit 230 may designate an ROI 212a, which includes a human face, on the background wallpaper 212 at operation 110. In FIG. 3C, the display control unit 220 controls the display unit 210 to display the background wallpaper at operation 130. In addition, at operation 140, the display control unit 220 controls the display unit 210 to display the user interface elements 211a, 211b on an area of the displayed background wallpaper 212 without covering the ROI 212a. In one embodiment, the display control unit 220 moves the user interface elements 211a, 211b for displaying the user interface elements 211a, 211b without covering the ROI 212a. In another embodiment of this invention, the processing unit 230 may further designate an area outside the ROI 212a (in other words, an area without any human face) as an available area 212b. Subsequently, the display control unit 220 moves the user interface elements 211a, 211b to the available area 212b of the background wallpaper 212. Hence, the user interface elements 211a, 211b are displayed on the area of the background wallpaper 212 outside the ROI 212a.

Figure 4A:
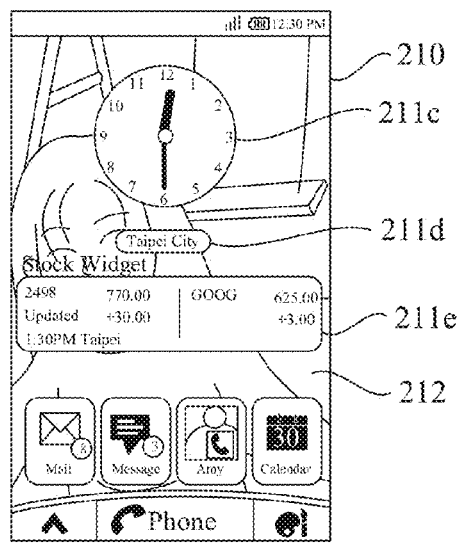
FIG. 4A to FIG. 4C illustrate an embodiment of the manner in which user interface elements are moved or adjusted.
Figure 4B:
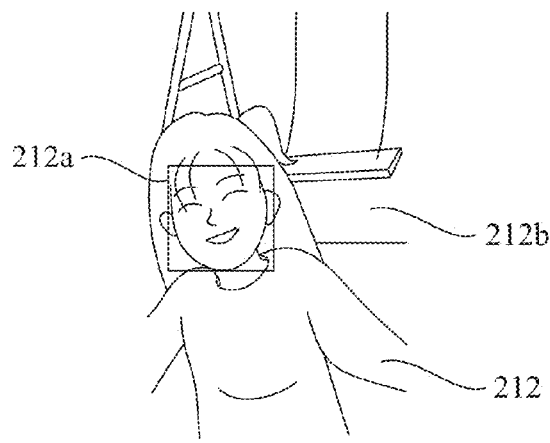
Figure 4C:
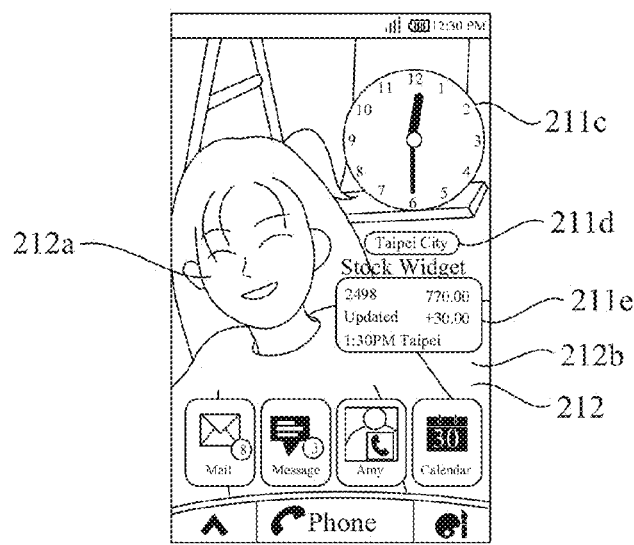

FIG. 4A to FIG. 4C illustrate an embodiment of the manner in which user interface elements are moved or adjusted. In FIG. 4A, the display unit 210 displays several user interface elements 211c, 211d, 211e. In FIG. 4B, if the subject of interest is set to a human face, the processing unit 230 may designate an ROI 212a, which includes a human face, on the background wallpaper 212 at operation 110. In FIG. 4C, the display control unit 220 controls the display unit 210 to display the background wallpaper at operation 130. In addition, at operation 140, the display control unit 220 controls the display unit 210 to display the user interface elements 211c, 211d, 211e on an area of the displayed background wallpaper 212 without covering the ROI 212a. The display control unit 220 moves the user interface elements 211c, 211d for displaying the user interface elements 211c, 211d without covering the ROI 212a. Furthermore, the display control unit 220 adjusts the size of the user interface element 211e displayed on the display unit 210, such that the adjusted size of the user interface element 211e is small enough to be displayed without covering the ROI 212a. Hence, the user interface element 211e, which has a large size, is prevented from visually blocking the subject which interests users.

In another embodiment of this invention, the processing unit 230 may further designate an area outside the ROI 212a (in other words, an area without any human face) as an available area 212b. Subsequently, the display control unit 220 moves the user interface elements 211c, 211d to the available area 212b of the background wallpaper 212, such that the user interface elements 211c, 211d do not block the ROI 212a. Moreover, the display control unit 220 adjusts the size of the user interface element 211e displayed on the display unit 210 to a size smaller than the size of the available area 212b to avoid blocking the ROI 212a, for example, a size small enough to fit on the available area 212b together with the user interface elements 211c, 211d.

Figure 5A:
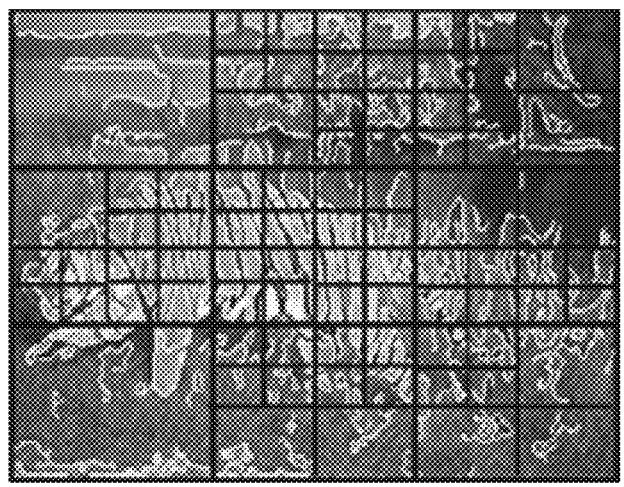
FIG. 5A to FIG. 5C illustrate an embodiment of the manner in which an ROI on a background wallpaper may be designated.
Figure 5B:
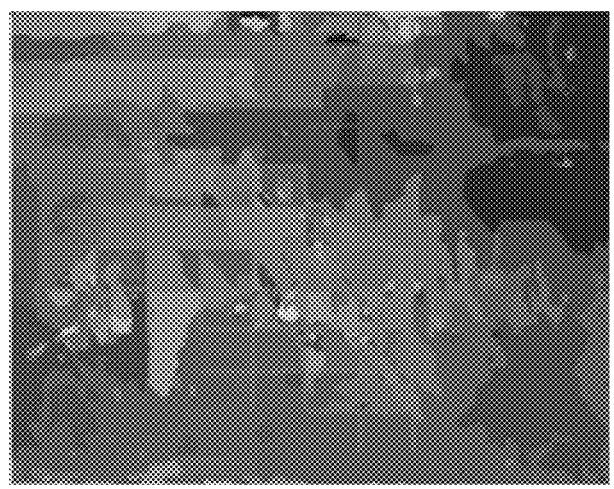
Figure 5C:
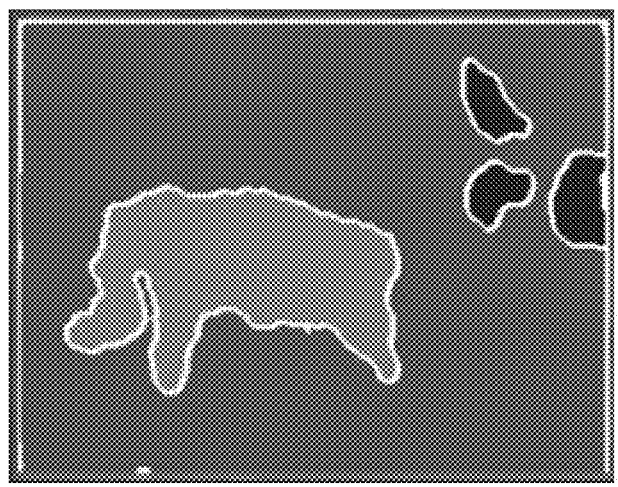

Three analysis methods may be employed by the processing unit 230 to designate an ROI on the background wallpaper, which are disclosed as follows:

1. Analyzing according to image characteristic values. The processing unit 230 may analyze the image characteristic values of the whole background wallpaper (for example, colors, textures, and lines on the background wallpaper). The processing unit 230 divides the background wallpaper into several small pieces according to complexity of the image characteristic values of the whole background wallpaper. For example, as shown in FIG. 5A, the areas with complicated textures or colors are divided into more pieces, and the areas with simple textures or colors are divided into a smaller number of pieces, each with a relatively large size. Subsequently, as shown in FIG. 5B, the processing unit 230 executes smooth filtering to eliminate noise and maintain the representative characteristic values on the background wallpaper according to the sizes of the divided pieces of the background wallpaper. Subsequently, the processing unit 230 merges the smooth filtered pieces until a subject of interest on the background wallpaper is highlighted. Hence, a subject of interest can be obtained, and subsequently the ROI can be designated.

2. Detecting a specific object. Several different algorithms can be utilized to detect meaningful objects for users, such as human faces, objects, words, vehicles, facial features, etc. For different objects, there are corresponding algorithms. The processing unit 230 can utilize such corresponding algorithms to detect objects on the background wallpaper and the area that the detected objects are displayed on, which can be subsequently taken as the ROI as shown in FIG. 3B and FIG. 4B.

3. User feedback. Such a method can be combined with methods in 1 and 2. When the processing unit 230 detects more than two ROIs, a user can designate one of the ROIs through a user interface of the electrical apparatus 200, such that the processing unit 230 is provided input with respect to the characteristics of the preferred ROI. The next time the processing unit 230 detects two or more ROIs, the processing unit 230 can assign different weights to different ROIs, and can subsequently predict an ROI which users may prefer. Hence, input by the users to select the detected ROI is minimized in such subsequent instances of detecting two or more ROIs.

In addition, the processing unit 230 may utilize an ROI technique to detect a hot spot on the background wallpaper, which users may deem important, such as a human face or an architectural structure in a photograph. Subsequently, the processing unit 230 may take the hot spot (ROI) as the area which should not be visually blocked, and rearrange the user interface elements. Furthermore, the processing unit 230 may move user interface elements or adjust sizes of user interface elements according to the size of the available area. Therefore, when users change the background wallpaper displayed on the electrical apparatus 200, users do not have to concern themselves with the positions of the user interface elements, and the ROI will not be covered by the user interface elements.

The present invention can achieve many advantages. An area on the display unit for displaying an ROI is not covered by any user interface element. In other words, an area which interests users is not be visually blocked by any user interface element.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A method for displaying one or more user interface elements upon a background wallpaper on a display unit of an electrical apparatus, wherein the method comprises:
   analyzing image characteristic values of the background wallpaper, the image characteristic values including colors, textures, and lines on the background wallpaper;
   dividing the background wallpaper into a plurality of pieces according to complexity of the image characteristic values of the background wallpaper, wherein the more complex the image characteristic values of a part of the background wallpaper is, the greater the number of the pieces that the part of the background wallpaper is divided;
   executing smooth filtering on the background wallpaper according to sizes of the divided pieces of the background wallpaper;
   merging the smooth filtered pieces to designate a subject of interest on the background wallpaper; and
   displaying the one or more user interface elements upon the background wallpaper without covering a Region of Interest (ROI), wherein the ROI comprises the subject of interest on the background wallpaper.

2. The method of claim 1, wherein the operation of displaying the one or more user interface elements upon the background wallpaper without covering the ROI comprises:
   moving at least one of the one or more user interface elements so that the one or more user interface elements are displayed upon the background wallpaper without covering the ROI.

3. The method of claim 1, wherein the operation of displaying the one or more user interface elements upon the background wallpaper without covering the ROI comprises:
   adjusting the size of at least one of the one or more user interface elements so that the one or more user interface elements are displayed upon the background wallpaper without covering the ROI.

4. The method of claim 1, wherein the subject of interest is a human face.

5. The method of claim 1, wherein the background wallpaper is a live wallpaper, which comprises a plurality of continuous images, and the method further comprises:
   analyzing the continuous images to designate the ROI on the background wallpaper.

6. The method of claim 1, wherein each of the one or more user interface elements is an icon, a widget, a notification or a button.

7. A non-transitory computer storage medium storing a computer program product, wherein the computer program product comprises a computer program for an electrical apparatus to execute a method for displaying one or more user interface elements upon a background wallpaper on a display unit of the electrical apparatus when the computer program is loaded into the electrical apparatus, the method comprises:
   analyzing image characteristic values of the background wallpaper, the image characteristic values including colors, textures, and lines on the background wallpaper;
   dividing the background wallpaper into a plurality of pieces according to complexity of the image characteristic values of the background wallpaper, wherein the more complex the image characteristic values of a part of the background wallpaper is, the greater the number of the pieces that the part of the background wallpaper is divided;
   executing smooth filtering on the background wallpaper according to the sizes of the divided pieces of the background wallpaper;
   merging the smooth filtered pieces to designate a subject of interest on the background wallpaper; and
   displaying the one or more user interface elements upon the background wallpaper without covering a Region of Interest (ROI), wherein the ROI comprises the subject of interest on the background wallpaper.

8. The non-transitory computer storage medium of claim 7, wherein the operation of displaying the one or more user interface elements upon the background wallpaper without covering the ROI comprises:

moving at least one of the one or more user interface elements so that the one or more user interface elements are displayed upon the background wallpaper without covering the ROI.

9. The non-transitory computer storage medium of claim 7, wherein the operation of displaying the one or more user interface elements upon the background wallpaper without covering the ROI comprises:
adjusting the size of at least one of the one or more user interface elements so that the one or more user interface elements are displayed upon the background wallpaper without covering the ROI.

10. The non-transitory computer storage medium of claim 7, wherein the subject of interest is a human face.

11. The non-transitory computer storage medium of claim 7, wherein the background wallpaper is a live wallpaper, which comprises a plurality of continuous images, and the method further comprises:
analyzing the continuous images to designate the ROI on the background wallpaper.

12. The non-transitory computer storage medium of claim 7, wherein each of the one or more user interface elements is an icon, a widget, a notification or a button.

13. An electrical apparatus comprising:
a display unit;
a display control unit electrically connected to the display unit, wherein the display control unit is configured to control the display unit; and
a processing unit electrically connected to the display control unit, wherein the processing unit analyzes image characteristic values of a background wallpaper, the image characteristic values including colors, textures, and lines on the background wallpaper,
the processing unit divides the background wallpaper into a plurality of pieces according to complexity of the image characteristic values of the background wallpaper, wherein the more complex the image characteristic values of a part of the background wallpaper is, the greater the number of the pieces that the part of the background wallpaper is divided;
wherein the processing unit executes smooth filtering on the background wallpaper according to sizes of the divided pieces of the background wallpaper;
wherein the processing unit merges the smooth filtered pieces to designate a subject of interest on the background wallpaper, and
the display control unit controls the display unit to display the one or more user interface elements upon the background wallpaper without covering a Region of Interest (ROI), wherein the ROI comprises the subject of interest on the background wallpaper.

14. The electrical apparatus of claim 13, wherein the display control unit moves at least one of the one or more user interface elements so that the one or more user interface elements are displayed upon the background wallpaper without covering the ROI.

15. The electrical apparatus of claim 13, wherein the display control unit adjusts the size of at least one of the one or more user interface elements so that the one or more user interface elements are displayed upon the background wallpaper without covering the ROI.

16. The electrical apparatus of claim 13, wherein the subject of interest is a human face.

17. The electrical apparatus of claim 13, wherein:
the background wallpaper is a live wallpaper, which comprises a plurality of continuous images; and
the processing unit further analyzes the continuous images to designate the ROI on the background wallpaper.

18. The electrical apparatus of claim 13, wherein each of the one or more user interface elements is an icon, a widget, a notification or a button.

* * * * *